United States Patent
Kim et al.

(10) Patent No.: US 12,544,346 B2
(45) Date of Patent: Feb. 10, 2026

(54) AQUEOUS ANTISEPTIC COMPOSITION HAVING IMPROVED ANTIBACTERIAL PERSISTENCE COMPRISING CHLORHEXIDINE OR DERIVATIVE THEREOF AND FABRIC TYPE ANTISEPTIC COMPRISING SAME

(71) Applicants: HUONS CO., LTD., Seongnam-si (KR); HUONS MEDITECH CO., LTD., Seongnam-si (KR)

(72) Inventors: Bae Young Kim, Seoul (KR); Dong Il Lee, Bucheon-si (KR); Eun Kyoung Lee, Hwaseong-si (KR); Min Hee Kang, Pyeongtaek-si (KR); Jae Min Cho, Seoul (KR); Joon Gyo Oh, Suwon-si (KR); Sang Man Lee, Anyang-si (KR)

(73) Assignees: HUONS CO., LTD., Seongnam-si (KR); HUONS MEDITECH CO., LTD., Seongnam-si (KR)

( * ) Notice: Subject to any disclaimer, the term of this patent is extended or adjusted under 35 U.S.C. 154(b) by 1058 days.

(21) Appl. No.: 17/629,197

(22) PCT Filed: Jun. 24, 2020

(86) PCT No.: PCT/KR2020/008139
§ 371 (c)(1),
(2) Date: Jan. 21, 2022

(87) PCT Pub. No.: WO2021/015426
PCT Pub. Date: Jan. 28, 2021

(65) Prior Publication Data
US 2022/0249407 A1  Aug. 11, 2022

(30) Foreign Application Priority Data
Jul. 22, 2019  (KR) .................. 10-2019-0088288

(51) Int. Cl.
| A61K 31/155 | (2006.01) |
| A61K 9/00 | (2006.01) |
| A61K 9/70 | (2006.01) |
| A61K 47/14 | (2017.01) |
| A61K 47/34 | (2017.01) |

(52) U.S. Cl.
CPC .......... *A61K 31/155* (2013.01); *A61K 9/0014* (2013.01); *A61K 9/7007* (2013.01); *A61K 47/14* (2013.01); *A61K 47/34* (2013.01)

(58) Field of Classification Search
CPC .................................................. A61K 31/155
See application file for complete search history.

(56) References Cited

U.S. PATENT DOCUMENTS

| 2003/0175333 A1* | 9/2003 | Shefer ................ A61K 8/671 514/61 |
| 2004/0191274 A1 | 9/2004 | Grayson et al. |
| 2007/0025948 A1 | 2/2007 | Saito |
| 2009/0186943 A1 | 7/2009 | Ikeda et al. |
| 2014/0343158 A1 | 11/2014 | Fusco |
| 2017/0319515 A1* | 11/2017 | Shabto ................ A61K 47/26 |

FOREIGN PATENT DOCUMENTS

| KR | 10-2018-0016338 A | 2/2018 | |
| WO | 2010-019155 A1 | 2/2010 | |
| WO | WO-2010096868 A1 * | 9/2010 | ............. A61K 31/00 |
| WO | 2016141450 A1 | 9/2016 | |

OTHER PUBLICATIONS

Danaei, M. et al., pharmaceutics, 2018, 10, 1-17 (Year: 2018).*
Gasparelo, A. P. et al., Zeta Potential and Particle Size to Predict Emulsion Stability, Cosmetics & Toiletries, 2014, 1-9, retrieved from https://www.cosmeticsandtoiletries.com on Apr. 29, 2025 (Year: 2014).*
Medline, Traditional Wound Care, published Dec. 7, 2015, 1-49, retrieved from https://www.yumpu.com/en/document/view/49050741/traditional-wound-care-brochure-medline Apr. 28, 2025 (Year: 2015).*
Rowe, R. C., Sheskey, P. J., & Owen, S. C. (2009). Handbook of Pharmaceutical excipients (6th ed.). APhA/Pharmaceutical Press (Year: 2009).*
USDA, Chlorhexidine, NOSB Material Database, 2010, 1-5 (Year: 2010).*
Brown, M.B. et al., (2011). Topical Product Formulation Development. In Topical and Transdermal Drug Delivery (eds H.A.E. Benson and A.C. Watkinson) (Year: 2011).*
International Search Report issued for International Application No. PCT/KR2020/008139 on Sep. 22, 2020, 4 pages.

* cited by examiner

*Primary Examiner* — John S Kenyon
*Assistant Examiner* — Sara Elizabeth Bell
(74) *Attorney, Agent, or Firm* — ROTHWELL, FIGG, ERNST & MANBECK, P.C.

(57) ABSTRACT

The present invention relates to: an aqueous (a water-soluble) antiseptic composition having improved antibacterial persistence comprising chlorhexidine or a derivative thereof and a silicon-based emulsifier; and a fabric type antiseptic comprising same. As the chlorhexidine or the derivative thereof is highly soluble and stable and well dispersed in an aqueous phase, the composition can exhibit excellent absorption efficiency when applied onto the skin and can ultimately maximize a cumulative emission amount of chlorhexidine or the derivative thereof. In addition, the use of the polyglyceryl fatty acid ester allows sustained release of chlorhexidine or the derivative thereof, thereby sustaining the antibacterial effect for a long time.

10 Claims, 1 Drawing Sheet

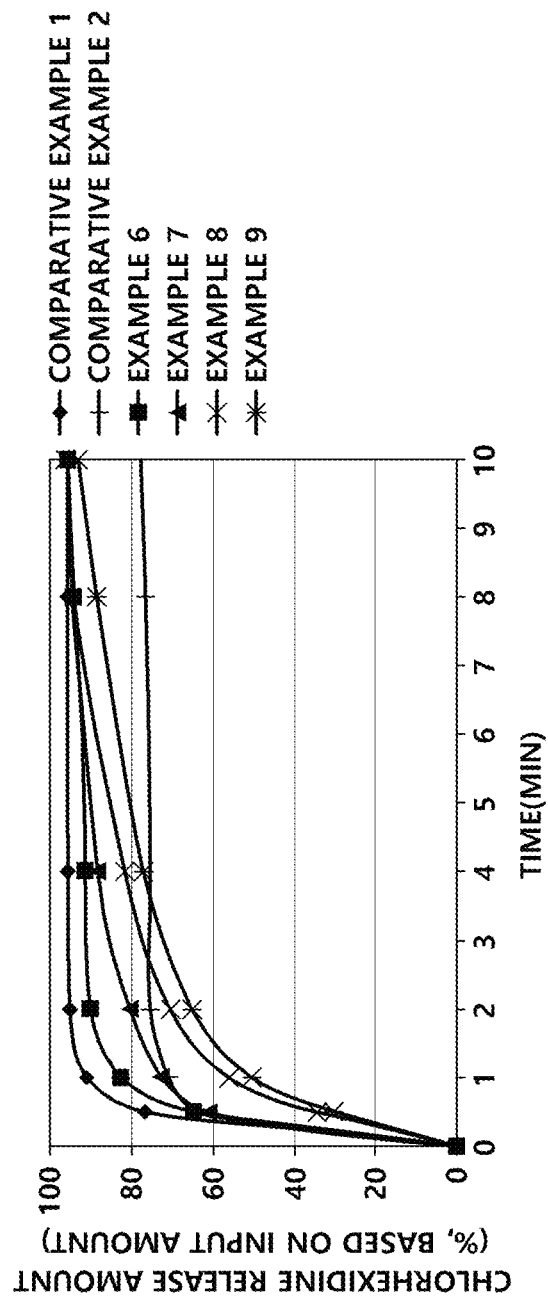

AQUEOUS ANTISEPTIC COMPOSITION HAVING IMPROVED ANTIBACTERIAL PERSISTENCE COMPRISING CHLORHEXIDINE OR DERIVATIVE THEREOF AND FABRIC TYPE ANTISEPTIC COMPRISING SAME

CROSS REFERENCE APPLICATION(S)

The application is a National Phase Entry from PCT/KR2020/008139, filed Jun. 24, 2020 and designating the United States, which claims priority to Korean Patent Application No. 10-2019-0088288, filed on Jul. 22, 2019, all disclosures of which are incorporated herein by reference in their entirety.

TECHNICAL FIELD

The present invention relates to an aqueous (a water-soluble) antiseptic composition having improved antibacterial persistence, which includes chlorhexidine or a derivative thereof, and a fabric-type antiseptic including the same.

BACKGROUND ART

Chlorhexidine has bactericidal and bacteriostatic actions against gram-negative and gram-positive bacteria in a wide range. This material is a bisbiguanide material, and is generally used as citrate, gluconate, and hydrochlorate. Its chemical names are 1,1'-hexamethylenebis[5-(4-chlorphenyl)biguanide]acetate, digluconate and dihydrochloride, and each type of chlorhexidine is an organic acid salt, consisting of a stabilized material.

Among them, the most stable organic acid salt material is a gluconate, which is widely used as an antiseptic agent, and has a strong bactericidal action at a high concentration and a low sensitivity to *Pseudomonas* and *Mycobacterium* at a low concentration according to a content. However, it exhibits an excellent bacteriostatic action against these strains. Commercially, gluconate is used in the form of a 20% aqueous stock solution, and its specification is listed in the pharmacopoeia worldwide.

As such, various studies on a water-soluble antiseptic composition including chlorhexidine or a derivative thereof have been conducted, but the chlorhexidine or a derivative thereof has low solubility and stability in water, and particularly, the water-soluble antiseptic composition including chlorhexidine or a derivative thereof is decreased in antibacterial persistence upon application to the skin, so research is needed to solve this problem.

DISCLOSURE

Technical Problem

The present invention provides a water-soluble antiseptic composition having improved antibacterial persistence, which includes chlorhexidine or a derivative thereof; and a silicone-based emulsifier.

However, technical problems to be solved in the present invention are not limited to the above-described problems, and other problems which are not described herein will be fully understood by those of ordinary skill in the art from the following descriptions.

Technical Solution

The present invention provides a water-soluble antiseptic composition having improved antibacterial persistence, which includes chlorhexidine or a derivative thereof; and a silicone-based emulsifier.

The chlorhexidine or a derivative thereof may be one or more selected from the group consisting of chlorhexidine, chlorhexidine gluconate, chlorhexidine dihydrochloride and chlorhexidine diacetate.

The silicone-based emulsifier may include one or more selected from the group consisting of simethicone, dimethicone and methicone.

The water-soluble antiseptic composition may further include a polyglyceryl fatty acid ester as an amphiphilic stabilizer.

The polyglyceryl fatty acid ester may have a hydrophile-lipophile balance (HLB) of 8 to 12.

The polyglyceryl fatty acid ester may be one or more PEG-based glyceryl fatty acid esters selected from the group consisting of PEG-23 glyceryl cocoate, PEG-7 glyceryl cocoate, PEG-20 glyceryl triisostearate and PEG-15 glyceryl monostearate.

With respect to 100 mL of the water-soluble antiseptic composition, 0.100 to 10 g of the chlorhexidine or a derivative thereof; and 0.001 to 10 g of the silicone-based emulsifier may be included.

The water-soluble antiseptic composition may be maintained at pH 4.5 to pH 6.5.

The 50% cumulative mass particle size distribution diameter (D50) of particles in the water-soluble antiseptic composition may be 0.1 to 10 µm, the polydispersity index (PDI) thereof may be 0.1 to 0.7, and the absolute value of zeta-potential may be 20 mV or less.

When 10 mL of the water-soluble antiseptic composition is applied to the skin and dried for 5 minutes, the cumulative release amount of the chlorhexidine or a derivative thereof for 10 minutes may be 90 wt % or more.

In one embodiment of the present invention, a fabric-type antiseptic having improved antibacterial persistence, which is prepared by coating or impregnating a fabric base with the water-soluble antiseptic composition, is provided.

The fabric base may be one or more selected from the group consisting of a non-woven fabric, a fabric, a knitted fabric, cotton, a sheet, hemostatic gauze, a band, a dressing, a suture and a tape.

The non-woven fabric may be one or more materials selected from the group consisting of rayon, polyethylene terephthalate, cotton, bamboo fiber, pulp, polyester and polypropylene.

With respect to the total content of the chlorhexidine or a derivative thereof, after the fabric-type antiseptic is stored for 3 months for long term conditions (temperature: 25° C. and relative humidity: 60%), the content of the chlorhexidine or a derivative thereof may be 99 wt % or more, and after the fabric-type antiseptic is stored for 3 months under accelerated conditions (temperature: 40° C. and relative humidity: 75%), the content of the chlorhexidine or a derivative thereof may be 95 wt % or more.

Advantageous Effects

A water-soluble antiseptic composition having improved antibacterial persistence according to the present invention includes chlorhexidine or a derivative thereof; a silicone-based emulsifier; and optionally a polyglyceryl fatty acid ester, and due to the use of the silicone-based emulsifier, the average diameter, PDI and absolute surface charge of particles in the water-soluble antiseptic composition can be maintained low. Therefore, as the chlorhexidine or a derivative thereof is well dispersed with high solubility and stability in water, it is expected that the water-soluble antiseptic composition has excellent absorption efficiency upon application to the skin. In addition, the final cumulative release amount of the chlorhexidine or a derivative thereof can be maximized. In addition, due to the use of the polyglyceryl fatty acid ester, the chlorhexidine or a derivative thereof can be sustained-released, exhibiting an antibacterial effect for a long time.

Further, when the water-soluble antiseptic composition is applied to or impregnated in a fabric base and used as a fabric-type antiseptic having improved antibacterial persistence, due to the use of the silicone-based emulsifier and the polyglyceryl fatty acid ester, the physical and chemical adsorption of the chlorhexidine or a derivative thereof to the fabric base can be prevented as much as possible. Therefore, it is expected that it will be possible to improve potential toxicity and increase production efficiency by lowering an application amount of the water-soluble antiseptic composition. In addition, the fabric-type antiseptic has an advantage of improving temporal stability under long-term and accelerated conditions.

DESCRIPTION OF DRAWINGS

FIG. 1 is a graph comparing the cumulative release amount of chlorhexidine gluconate over time among water-soluble antiseptic compositions prepared in Examples 6 to 9 and Comparative Examples 1 and 2.

MODES OF THE INVENTION

During the research to improve the antibacterial persistence of a water-soluble antiseptic composition, which includes chlorhexidine or a derivative thereof, the present inventors confirmed that, by adding a silicone-based emulsifier and optionally a polyglyceryl fatty acid ester, an antibacterial effect may be maintained for a long time, the physical and chemical adsorption of the chlorhexidine or a derivative thereof to a fabric base may be prevented as much as possible, and the temporal stability of a fabric-type antiseptic may be improved under long-term and accelerated conditions, and thus the present invention was completed.

The present invention provides a water-soluble antiseptic composition having improved antibacterial persistence, which includes chlorhexidine or a derivative thereof; and a silicone-based emulsifier.

Hereinafter, the present invention be described in detail.
Water-Soluble Antiseptic Composition Having Improved Antibacterial Persistence The present invention provides a water-soluble antiseptic composition having improved antibacterial persistence, which includes chlorhexidine or a derivative thereof; and a silicone-based emulsifier.

The "water-soluble antiseptic composition" used herein is a preparation for external use, which includes a water-soluble solvent, and excludes an alcoholic solvent. The water-soluble antiseptic composition plays a role in increasing an adhesive property by applying it to the human body, such as the skin to be disinfected, and then volatilizing the water-soluble solvent, and the other components, which are not volatilized, form a stable film on the human body, such as the skin to be disinfected and serve to kill bacteria. In addition, since the water-soluble antiseptic composition has no alcoholic solvent, it may be less irritating to the skin, and may not be decreased in final cumulative release amount of the main ingredient due to the volatilization of the alcoholic solvent.

First, the water-soluble antiseptic composition having improved antibacterial persistence according to the present invention includes chlorhexidine or a derivative thereof. The chlorhexidine or a derivative thereof is preferably one or more selected from the group consisting of chlorhexidine, chlorhexidine: gluconate, chlorhexidine dihydrochloride and chlorhexidine, diacetate, but the present invention is not limited thereto. Meanwhile, a chlorhexidine salt such as chlorhexidine gluconate is present as an aqueous solution, and the chlorhexidine may be contained at 10 to 30 wt %, and preferably 20 wt % with respect to the total weight of the aqueous solution, but the present invention is not limited thereto.

Here, the content of the chlorhexidine or a derivative thereof may be 0.100 to 10 g, and preferably 1 to 5 g with respect to 100 mL of the water-soluble antiseptic composition, but the present invention is not limited thereto.

Also, the water-soluble antiseptic composition having improved antibacterial persistence according to the present invention includes a silicone-based emulsifier. The silicone-based emulsifier may keep the average diameter PDI and absolute surface charge of particles in the water-soluble antiseptic composition small. Therefore, by well dispersing the chlorhexidine or a derivative thereof with high solubility and stability in water, the water-soluble antiseptic composition is expected to have excellent absorption efficiency upon application to the skin. Moreover, the final cumulative release amount of the chlorhexidine or a derivative thereof may be maximized. The silicone-based emulsifier may include one or more selected from the group consisting of simethicone, dimethicone and methicone, and preferably includes simethicone, but the present invention is not limited thereto. Here, the simethicone refers to a mixture of dimethicone (polydimethysiloxane) having an average chain length of 200 to 300 dimethylsiloxane units and hydrated silica. In the present invention, as a silicone-based emulsifier, a simethicone emulsion was used, and here, the simethicone emulsion has a pH of 2.0 to 3.0 or less, and contains 20 to 40 wt % of dimethicone (polydimethylsiloxane) with respect to the total content of the simethicone emulsion.

Here, the content of the silicone-based emulsifier may be 0.001 to 10 g, preferably 0.01 to 5 g, and more preferably 0.01 to 1 g with respect to 100 mL of the water-soluble antiseptic composition, but the present invention is not limited thereto. When the content of the silicone-based emulsifier is beyond the above range, the average diameter, PDI and absolute surface charge of particles in the water-soluble antiseptic composition become too high, so the chlorhexidine or a derivative thereof with high solubility and stability may not be well dispersed in water.

Optionally, the water-soluble antiseptic composition having improved antibacterial persistence according to the present invention includes a polyglyceryl fatty acid ester as an amphiphilic stabilizer. The polyglyceryl fatty acid ester may have a glyceryl fatty acid ester group corresponding to a hydrophobic end, and a polyethylene glycol (PEG) group corresponding to a hydrophilic end. Specifically, the polyglyceryl fatty acid ester may have a HLB of 8 to 12, and preferably 9 to 11, but the present invention is not limited thereto. Accordingly, the polyglyceryl fatty acid ester may be present at the interface between an aqueous solution containing the chlorhexidine or a derivative thereof and the silicone-based emulsifier. Therefore, it may allow the chlorhexidine or a derivative thereof to be sustained-released, and maintain an antibacterial effect for a long time. The polyglyceryl fatty acid ester may be one or more PEG-based glyceryl fatty acid esters selected from the group consisting of PEG-23 glyceryl cocoate, PEG-7 glyceryl cocoate, PEG-20 glyceryl triisostearate and PEG-15 glyceryl monostearate, and preferably PEG glyceryl cocoate, but the present invention is not limited thereto.

Here, the content of the polyglyceryl fatty acid ester may be 0.001 to 10 g. preferably 0.01 to 0.50 g, and more preferably 0.01 to 0.1 g with respect to 100 mL of the water-soluble antiseptic composition, but the present invention is not limited thereto. When the content of the polyglyceryl fatty acid ester is beyond the range, the initial chlorhexidine gluconate cumulative release amount may be greatly increased.

In addition, the water-soluble antiseptic composition having improved antibacterial persistence according to the present invention includes an aqueous solvent, excluding an alcoholic solvent. The water-soluble antiseptic composition is applied to the human body such as the skin to be disinfected, and increases an adhesive property due to the volatilization of the aqueous solvent, and the other components, which are not volatilized, form a stable film on a human body such as the skin to be disinfected and act as a disinfectant.

In addition, the water-soluble antiseptic composition having improved antibacterial persistence according to the present invention may further include other additives. The additives may be one or more selected from the group consisting of, for example, a softening agent, a surfactant, a pH adjuster, a fragrance ingredient, a preservative, a solubilizer, an emulsifier, an antioxidant and a colorant.

Specifically, the softening agent may provide flexibility to the water-soluble antiseptic composition, and may be, for example, concentrated glycerin, allantoin, and diisobutyl adipate.

In addition, the surfactant is used to lower the surface tension of the water-soluble antiseptic composition, and may be, for example, a non-ionic surfactant selected from the group consisting f polysorbate 20, polysorbate 40, polysorbate 60, polysorbate 65 and polysorbate 80.

In addition, the pH adjuster may be used to adjust the acidity of the water-soluble antiseptic composition to an appropriate level, and may be, for example, an acidic material such as hydrochloric acid or a basic material such as sodium hydroxide. Here, the content of the pH adjuster may be a suitable amount to maintain the water-soluble antiseptic composition at pH 3.0 to pH 8.0, and preferably pH 4.5 to pH 6.5, but the present invention is not limited thereto.

Therefore, the 50% cumulative mass particle size distribution diameter (D50) of particles in the water-soluble antiseptic composition having improved antibacterial persistence according to the present invention may be 0.1 to 10 μm, the polydispersity index (PM) thereof may be 0.1 to 0.7, and the absolute value of zeta-potential may be 20.0 mV or less, and the D50 of particles in the water-soluble antiseptic composition is 0.1 to 10 μm, the polydispersity index (PDI) thereof may be 0.100 to 0.500, and the absolute value of zeta-potential may be 5.0 mV or less, but the present invention is not limited thereto. As such, the average diameter, PDI and absolute surface charge of particles in the water-soluble antiseptic composition may be maintained low, which may be, as described above, an effect resulting from the use of the optimal content of the silicone-based emulsifier.

In addition, when 10 mL of the water-soluble antiseptic composition is applied to the skin, and dried for 5 minutes, the cumulative release amount of the chlorhexidine or a derivative thereof for 10 minutes may be 90 wt % or more. Meanwhile, the cumulative release amount of the chlorhexidine or a derivative thereof for 0.5 minute is preferably 50 wt % or less, and more preferably 40 wt % or less, but the present invention is not limited thereto. As such, the long-term maintenance of the antibacterial effect by the sustained-release of the chlorhexidine or a derivative thereof may result from, as described above, the use of the optimal content of polyglyceryl fatty acid ester as the amphiphilic stabilizer.

Fabric-Type Antiseptic Having Improved Antibacterial Persistence

The present invention provides a fabric-type antiseptic having improved antibacterial persistence, which is prepared by coating or impregnating a fabric base with the water-soluble antiseptic composition of claim 1.

First, the fabric-type antiseptic having improved antibacterial persistence according to the present invention is prepared by coating or impregnating a fabric base with the water-soluble antiseptic composition and since the "water-soluble antiseptic composition" has been described above, a duplicate description will be omitted.

In addition, the fabric base may be one or more selected from the group consisting of non-woven fabrics, fabrics, knitted fabrics, cotton, a sheet hemostatic gauze a band, a dressing, a suture and a tape, and preferably, non-woven fabrics consisting of one or more materials selected front the group consisting of rayon, polyethylene terephthalate (PET; poly(ethyl benzene-1,4-dicarboxylate)), cotton, bamboo fibers, pulp, polyester and polypropylene, but the present invention is not limited thereto.

According to previous research, in the antiseptic eluding chlorhexidine or a derivative thereof, it has been reported that the chlorhexidine or a derivative thereof may be adsorbed to a non-woven fabric. However, according to the present invention, by the use of the silicone-based emulsifier and the polyglyceryl fatty acid ester, the physical and chemical adsorption of the chlorhexidine or a derivative thereof to the fabric base may be prevented as much as possible, and thus it is expected that it will be possible to improve potential toxicity and increase production efficiency by lowering an application amount of the water-soluble antiseptic composition.

In addition, the fabric-type antiseptic has an advantage of improving temporal stability under long-term and accelerated conditions, and wish respect to the total content of the chlorhexidine or a derivative thereof, the content of the chlorhexidine or a derivative thereof after the fabric-type antiseptic is stored for 3 months under long-term conditions (temperature: 25° C. and relative humidity: 60%) may be 99 wt % or more, and the content of the chlorhexidine or a derivative thereof after the fabric-type antiseptic is stored for 3 months under accelerated conditions (temperature: 40° C. and relative humidity: 75%), may be 95 wt % or more.

As described above, the water-soluble antiseptic composition having improved antibacterial persistence according to the present invention includes chlorhexidine or a derivative thereof; a silicone-based emulsifier; and optionally a polyglyceryl fatty acid ester, and by the use of the silicone-based emulsifier, the average diameter, PDI and absolute surface charge of particles in the water-soluble antiseptic composition may be maintained low. Accordingly, as the chlorhexidine or a derivative thereof is well dispersed with high solubility and stability in water, the a position is expected to have excellent absorption efficiency upon application to the skin. In addition, the final cumulative release amount of the chlorhexidine or a derivative thereof may be maximized. In addition, due to the use of the polyglyceryl fatty acid ester, the sustained release of the chlorhexidine or a derivative thereof is possible, and thus the antibacterial effect may be maintained for a long time.

hydrochloric acid as pH adjusters or ethanol as an alcoholic solvent were added and dissolved, purified water was added to have the final volume of 100 mL, and then the resulting solution was filtered through a 0.2-μm membrane filter, thereby preparing a water-soluble antiseptic composition. Here, the water-soluble antiseptic composition was maintained at pH 4.5 to pH 6.5.

TABLE 1

| | | Example 1 | Example 2 | Example 3 | Example 4 | Example 5 | Example 6 | Example 7 | Example 8 | Example 9 | Example 10 | Comparative Example 1 | Comparative Example 2 | Comparative Example 3 |
|---|---|---|---|---|---|---|---|---|---|---|---|---|---|---|
| Main ingredient | Chlorhexidine gluconate solution (20%) (g) | 4 | 4 | 4 | 4 | 4 | 4 | 4 | 4 | 4 | 4 | 4 | 4 | 4 |
| Silicone based emulsifier | Simethicone emulsion (g) | 0.001 | 0.01 | 0.1 | 0.5 | 1 | 5 | 0.016 | 0.016 | 0.016 | 0.016 | — | — | — |
| Amphiphilic stabilizer | PEG-23 glyceryl cocoate (g) | — | — | — | — | — | — | 0.001 | 0.01 | 0.1 | 0.5 | — | — | 0.1 |
| Softening agent | Concentraded glycerin | q.s. | q.s. | q.s. | q.s. | q.s. | q.s. | q.s. | q.s. | q.s. | q.s. | q.s. | q.s. | q.s. |
| Surfactant | Polysorbate 20 | q.s. | q.s. | q.s. | q.s. | q.s. | q.s. | q.s. | q.s. | q.s. | q.s. | q.s. | q.s. | q.s. |
| pH adjuster | Citric acid | q.s. | q.s. | q.s. | q.s. | q.s. | q.s. | q.s. | q.s. | q.s. | q.s. | q.s. | q.s. | q.s. |
| | Hydrochloric acid | q.s. | q.s. | q.s. | q.s. | q.s. | q.s. | q.s. | q.s. | q.s. | q.s. | q.s. | q.s. | q.s. |
| Solvent | Ethanol (g) | — | — | — | — | — | — | — | — | — | — | — | 65 | — |
| | Purified water | q.s. | q.s. | q.s. | q.s. | q.s. | q.s. | q.s. | q.s. | q.s. | q.s. | q.s. | q.s. | q.s. |

Further, when the fabric-type antiseptic having improved antibacterial persistence prepared by coating or impregnating a fabric base with the water-soluble antiseptic composition, due to the use of the silicone-based emulsifier and the polyglyceryl fatty acid ester, the physical and chemical adsorption of the chlorhexidine or a derivative thereof to the fabric base may be prevented as much as possible, and therefore, it is expected that it is possible to improve potential toxicity and increase production efficiency by lowering an application amount of the water-soluble antiseptic composition. In addition, the fabric-type antiseptic has an advantage of improving temporal stability under long-term and accelerated conditions.

Hereinafter, to help in understanding the present invention, exemplary examples will be suggested. However, the following examples are merely provided to more easily understand the present invention, and not to limit the present invention.

EXAMPLES

Examples 1 to 10 and Comparative Examples 1 to 3

Water-soluble antiseptic compositions were prepared with the compositions shown in Table 1 below. Specifically, a chlorhexidine gluconate solution (20%) (MEDICHEM S.A., Spain) as the main ingredient; a simethicone emulsion (DOW CORNING Corp., U.S.A.) as a silicone-based emulsifier; PEG-23 glyceryl cocoate (Protameen Chemical, U.S.A.) as an amphiphilic stabilizer; concentrated glycerin (SS Pharm Co., LTD, Korea) as a softening polysorbate 20 (Caw Corporation, Japan) as a surfactant; tartaric acid and Experimental Example 1: Measurement of DSO, PDI and Zeta-Potential of Particles in Antiseptic Composition To optimize the content of the simethicone emulsion as a silicone-based emulsifier in the water-soluble antiseptic compositions prepared in Examples 1 to 6 and Comparative Example 1, for the water-soluble antiseptic compositions prepared in Examples 1 to 6 and Comparative Example 1, the D50, PDI and zeta-potential of the particles were measured using a Zeta-sizer. The results are shown in Table 2.

TABLE 2

| Classification | D50 (nm) | PDI | Zeta-potential (mV) |
|---|---|---|---|
| Example 1 | 6.87 | 0.677 | −11.8 |
| Example 2 | 0.64 | 0.344 | −4.3 |
| Example 3 | 0.33 | 0.220 | −3.3 |
| Example 4 | 0.29 | 0.234 | −3.6 |
| Example 5 | 0.50 | 0.268 | −4.8 |
| Example 6 | 1.12 | 0.446 | −7.7 |
| Comparative Example 1 | — | 0.996 | −22.4 |

As shown in Table 2, it is confirmed that in the case of the water-soluble antiseptic compositions prepared in Examples 1 to 6, unlike the water-soluble antiseptic composition prepared in Comparative Example 1, since a simethicone emulsion as a silicone-based emulsifier is essentially included, the average diameter, PDI and absolute surface charge of the particles are low. Therefore, since, as the main ingredient, the chlorhexidine gluconate solution (20%) is well dispersed with high solubility and stability in water, it is expected to have excellent absorption efficiency upon application to the skin.

Particularly, in the case of the water-soluble antiseptic compositions prepared in Examples 2 to 5, when the content of the simethicone emulsion as a silicone-based emulsifier is 0.01 to 1 mg per 100 mL of the composition, the D50 of the particles may be maintained at 1.0 μm or less, the PDI there of may be maintained at 0.5 or less, and the zeta potential thereof may be maintained at 5.0 mV or less. Therefore, as the main ingredient, the chlorhexidine gluconate solution (20%) can be more easily dispersed in water.

Experimental Example 2: Evaluation of Cumulative Release Amount of Chlorhexidine Gluconate of Antiseptic Composition As a silicone-based emulsifier in the water-soluble antiseptic compositions prepared in Examples 6 to 10 and Comparative Examples 1 to 3, to optimize the content of PEG-23 glyceryl cocoate as an amphiphilic stabilizer in the water-soluble antiseptic compositions prepared in Examples 6 to 10 and Comparative Examples 1 to 3, 10 mL each of the water-soluble antiseptic compositions prepared in Examples 6 to 10 and Comparative Example 1 to 3 was applied to the surface (2×2 cm², washed after immersion in 70% ethanol for 10 minutes) of pork skin similar to human skin, dried for approximately 5 minutes, immersed in approximately 5 mL of 0.01M PBS at 37° C. to obtain samples over time. Here, as much new eluate as a sampled amount was added. The main ingredient content in the sample obtained at each time point was analyzed through high-purity liquid chromatography (measurement wavelength: 239 nm), a cumulative release amount of the chlorhexidine gluconate (%, based on input amount) was calculated, and the result is shown in Table 3 and FIG. 1.

TABLE 3

| | Initial (%) | After 0.5 minute (%) | After 1 minute (%) | After 2 minute (%) | After 4 minute (%) | After 8 minute (%) | After 10 minute (%) |
|---|---|---|---|---|---|---|---|
| Example 6 | 0 | 64.4 | 82.4 | 89.9 | 91.2 | 93.4 | 95.8 |
| Example 7 | 0 | 60.9 | 72.4 | 80.4 | 88.4 | 94.2 | 95.8 |
| Example 8 | 0 | 34.4 | 56.1 | 70.4 | 81.7 | 94.4 | 96.5 |
| Example 9 | 0 | 30.1 | 50.4 | 65.2 | 76.4 | 88.4 | 93.1 |

As shown in Table 3 and FIG. 1, it is confirmed that in the case of the water-soluble antiseptic compositions prepared in Examples 6 to 10, unlike the water-soluble antiseptic compositions prepared in Comparative Examples 1 to 3, since a simethicone emulsion as a silicone-based emulsifier is essentially included, the final cumulative release amount of the chlorhexidine gluconate can be maximized.

Particularly, in the case of the water-soluble antiseptic compositions prepared in Examples 8 to 10, when the content of PEG-23 glyceryl cocoate as an amphiphilic stabilizer per 100 ml, of the composition is 0.01 to 0.5 mg, it is confirmed that the cumulative release amount of chlorhexidine gluconate was 50% or less for 0.5 minutes, and 90% or more for 10 minutes. This can be seen as a result f delaying the release of chlorhexidine gluconate by protection thereof according to the unique amphiphilic property of the PEG-23 glyceryl cocoate. Therefore, the antibacterial effect can be sustained for a long time as sustained release is possible since the final cumulative release amount of chlorhexidine gluconate is maximized while the initial release amount of chlorhexidine gluconate is decreased.

Meanwhile, in the case of the water-soluble antiseptic composition of Comparative Example 2, ethanol was used as an alcoholic solvent to increase the initial cumulative release amount of chlorhexidine gluconate, and due to ethanol volatilization, it is confirmed that the final cumulative release amount of chlorhexidine gluconate is greatly decreased.

Experimental Example 3: Evaluation of Adsorption of Antiseptic Composition to Non-Woven Fabric According to previous studies, it has been reported that, in the water-soluble antiseptic composition including chlorhexidine or a derivative thereof, the chlorhexidine or a derivative thereof is able to be adsorbed to a non-woven fabric. To evaluate whether the chlorhexidine gluconate is also adsorbed to a non-woven fabric in the water-soluble antiseptic compositions prepared in Examples 2 and 9 and Comparative Examples 1 and 3, 12.5 mL each of the water-soluble antiseptic compositions prepared in Examples 2 and 9 and Comparative Examples 1 and 3 was evenly applied using a micropipette so that the non-woven fabrics of various materials (20×20 cm²) were sufficiently wetted but a liquid did not flow. Subsequently, approximately 10 mL of the composition was squeezed out of the non-woven fabric to evaluate the content of the chlorhexidine gluconate through high purity liquid chromatography (measurement wavelength: 239 nm). The result is shown in Table 4.

TABLE 4

| Classification | Content (wt %) of chlorhexidine gluconate in solution before application | Content (wt %) of chlorhexidine gluconate in solution squeezed out of non-woven fabric | | | | Difference in content (wt %) of chlorhexidine gluconate in solution before/after application | | | |
|---|---|---|---|---|---|---|---|---|---|
| | | Rayon 100% | PET 100% | Cotton 100% | SMP bamboo | Rayon 100% | PET 100% | Cotton 100% | SMP bamboo |
| Example 2 | 100.0 | 96.6 | 94.6 | 95.8 | 98.1 | −3.4 | −5.4 | −4.2 | −1.9 |
| Example 9 | 100.0 | 99.8 | 99.0 | 98.7 | 99.8 | −0.2 | −1.0 | −1.3 | −0.2 |
| Comparative Example 1 | 100.0 | 88.5 | 89.4 | 86.8 | 87.7 | −11.5 | −10.6 | −13.2 | −12.3 |
| Comparative Example 3 | 100.0 | 90.4 | 91.1 | 88.8 | 88.1 | −9.6 | −8.9 | −11.2 | −11.9 |

As shown in Table 4, unlike the water-soluble antiseptic compositions prepared in Comparative Examples 1 and 3, it is confirmed that in the case of the water-soluble antiseptic compositions prepared in Example 2 and 9 since a simethicone emulsion as a silicone-based emulsifier is essentially included, the content of chlorhexidine gluconate adsorbed to non-woven fabrics of various materials is relatively small.

Particularly, like the water-soluble antiseptic composition prepared in Example 9, when both of simethicone emulsion as a silicone-based emulsifier and PEG-23 glyceryl cocoate as an amphiphilic stabilizer are included, it is confirmed that the content of chlorhexidine gluconate adsorbed to non-woven fabrics of various materials is able to be decreased as much as possible. Therefore, it is expected that it will be possible to improve potential toxicity and increase production efficiency by lowering an application amount of the water-soluble antiseptic composition.

Experimental Example 3: Evaluation of Temporal Stability of Fabric-Type Antiseptic Under Long-Term and Accelerated Conditions To evaluate the temporal stability of the fabric-type antiseptics prepared in Examples 2 and 9 and Comparative Examples 1 to 3 under long-terra and accelerated conditions, the water-soluble antiseptic compositions prepared in Examples 2, 9 and Comparative Examples 1 to 3 was applied to a non-woven fabric made of 100% rayon and then packaged to prepare samples, and each sample was used to evaluate stability in a stability chamber under long-term (temperature: 25° C. and relative humidity: 60%) and accelerated (temperature: 40° C., relative humidity: 75%) conditions for approximately 3 months. Specifically, after storing for approximately 3 months, with respect to the total content (input amount) of chlorhexidine gluconate, the relative content of chlorhexidine gluconate was measured through high purity liquid chromatography, and the result is shown in Table 5.

TABLE 5

| | Content (wt %) of chlorhexidine gluconate after storage for approximately 3 months | | |
|---|---|---|---|
| | Initial | Long term conditions | Accelerated conditions |
| Example 2 | 100.0 | 99.9 | 98.9 |
| Example 9 | 100.0 | 99.9 | 99.8 |
| Comparative Example 1 | 100.1 | 93.1 | 74.4 |
| Comparative Example 2 | 100.1 | 95.4 | 70.7 |
| Comparative Example 3 | 100.1 | 96.8 | 90.3 |

As shown in Table 5, in the case of the antiseptics prepared in Examples 2 and 9, since a simethicone emulsion as a silicone-based emulsifier is essentially included, unlike the antiseptics prepared in Comparative Examples 1 to 3, it is confirmed that temporal stability is improved under long-term and accelerated conditions.

Particularly, like the antiseptic prepared in Example 9, when both of simethicone emulsion as a silicone-based emulsifier and PEG-23 glyceryl cocoate as an amphiphilic stabilizer are included, it is confirmed that temporal stability can be greatly improved under accelerated conditions.

It should be understood by those of ordinary skill in the art that the above description of the present invention is exemplary, and the exemplary embodiments disclosed herein can be easily modified into other specific forms without departing from the technical spirit or essential features of the present invention. Therefore, the exemplary embodiments described above should be interpreted as illustrative and not limited in any aspect.

INDUSTRIAL APPLICABILITY

The present invention relates to a water-soluble antiseptic composition having improved antibacterial persistence, which includes chlorhexidine or a derivative thereof, and a fabric-type antiseptic including the same, and can be used in the antiseptic and fabric-type antiseptic industries requiring antibacterial performance.

The invention claimed is:

1. A water-soluble antiseptic composition having antibacterial persistence, comprising chlorhexidine or salt thereof;
   silicone-based emulsifier; and
   one or more PEG-based glyceryl fatty acid esters having a hydrophile-lipophile balance (HLB) of 8 to 12, which is selected from the group consisting of PEG-23 glyceryl cocoate, PEG-7 glyceryl cocoate, PEG-20 glyceryl triisostearate, and PEG-15 glyceryl monostearate,
   wherein the water-soluble antiseptic composition comprises 0.1 to 10 g of the chlorhexidine or salt thereof, 0.01 to 1 g of the silicone-based emulsifier, and 0.01 to 0.5 g of the PEG-based glyceryl fatty acid esters with respect to 100 mL of the water-soluble antiseptic composition.

2. The composition of claim 1, wherein the chlorhexidine or a salt thereof is one or more selected from the group consisting of chlorhexidine, chlorhexidine gluconate, chlorhexidine dihydrochloride, and chlorhexidine diacetate.

3. The composition of claim 1, wherein the silicone-based emulsifier is one or more selected from the group consisting of simethicone, dimethicone, and methicone.

4. The composition of claim 1, wherein the composition has pH 4.5 to pH 6.5.

5. The composition of claim 1, wherein a 50% cumulative mass particle size distribution diameter (D50) of particles in the water-soluble antiseptic composition is 0.1 to 10 μm, a polydispersity index (PDI) thereof is 0.1 to 0.7, and an absolute value of zeta-potential is 20.0 mV or less.

6. The composition of claim 1, wherein when 10 mL of the water-soluble antiseptic composition is applied to a skin sample and dried for 5 minutes, a cumulative release amount of the chlorhexidine or a salt thereof for 10 minutes is 90 wt % or more.

7. A fabric-type antiseptic having antibacterial persistence, comprising the water-soluble antiseptic composition of claim 1 coated on or impregnated into a fabric base.

8. The antiseptic of claim 7, wherein the fabric base is one or more selected from the group consisting of non-woven fabrics, fabrics, knitted fabrics, cotton, a sheet, hemostatic gauze, a band, a dressing, a suture, and a tape.

9. The antiseptic of claim 8, wherein the non-woven fabrics one or more materials selected from the group consisting of rayon, polyethylene terephthalate, cotton, bamboo fiber, pulp, polyester, and polypropylene.

10. The antiseptic of claim 7, wherein, with respect to the total content of the chlorhexidine or a salt thereof, a content of the chlorhexidine or a salt thereof after the fabric-type antiseptic is stored for 3 months under long-term conditions of temperature 25° C. and relative humidity 60% is 99 wt % or more, and a content of the chlorhexidine or a salt thereof after the fabric-type antiseptic is stored for 3 months under accelerated conditions of temperature 40° C. and relative humidity 75% is 95 wt % or more.

* * * * *